No. 681,342. Patented Aug. 27, 1901.
E. PECKHAM.
CAR TRUCK.
(Application filed June 6, 1901.)
(No Model.) 2 Sheets—Sheet 1.
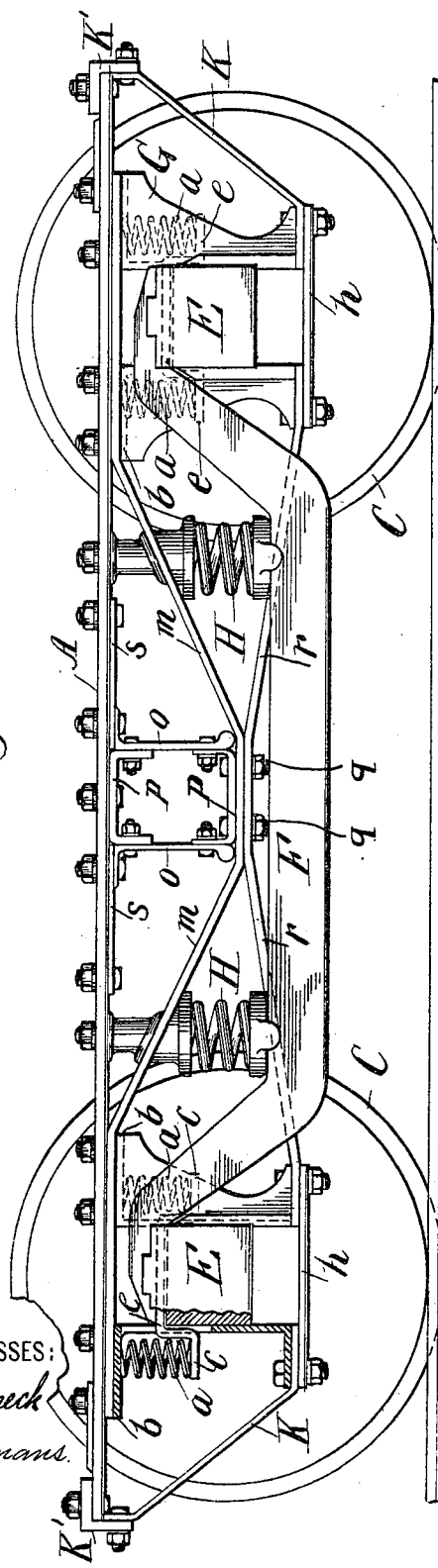
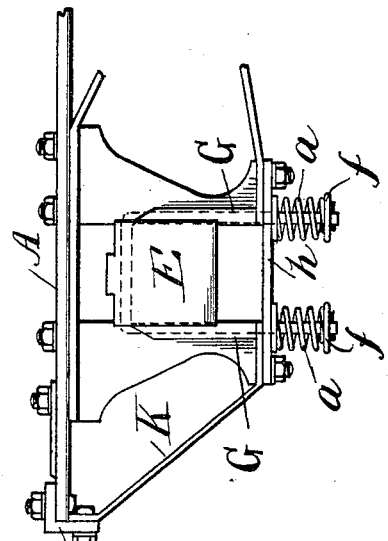
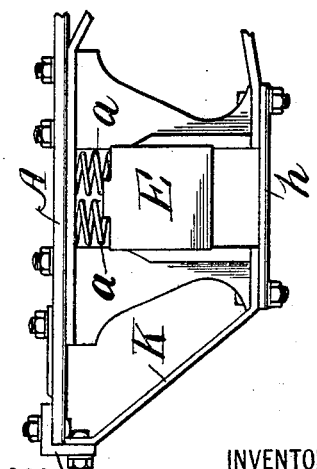
WITNESSES:
INVENTOR
Edgar Peckham
ATTORNEYS

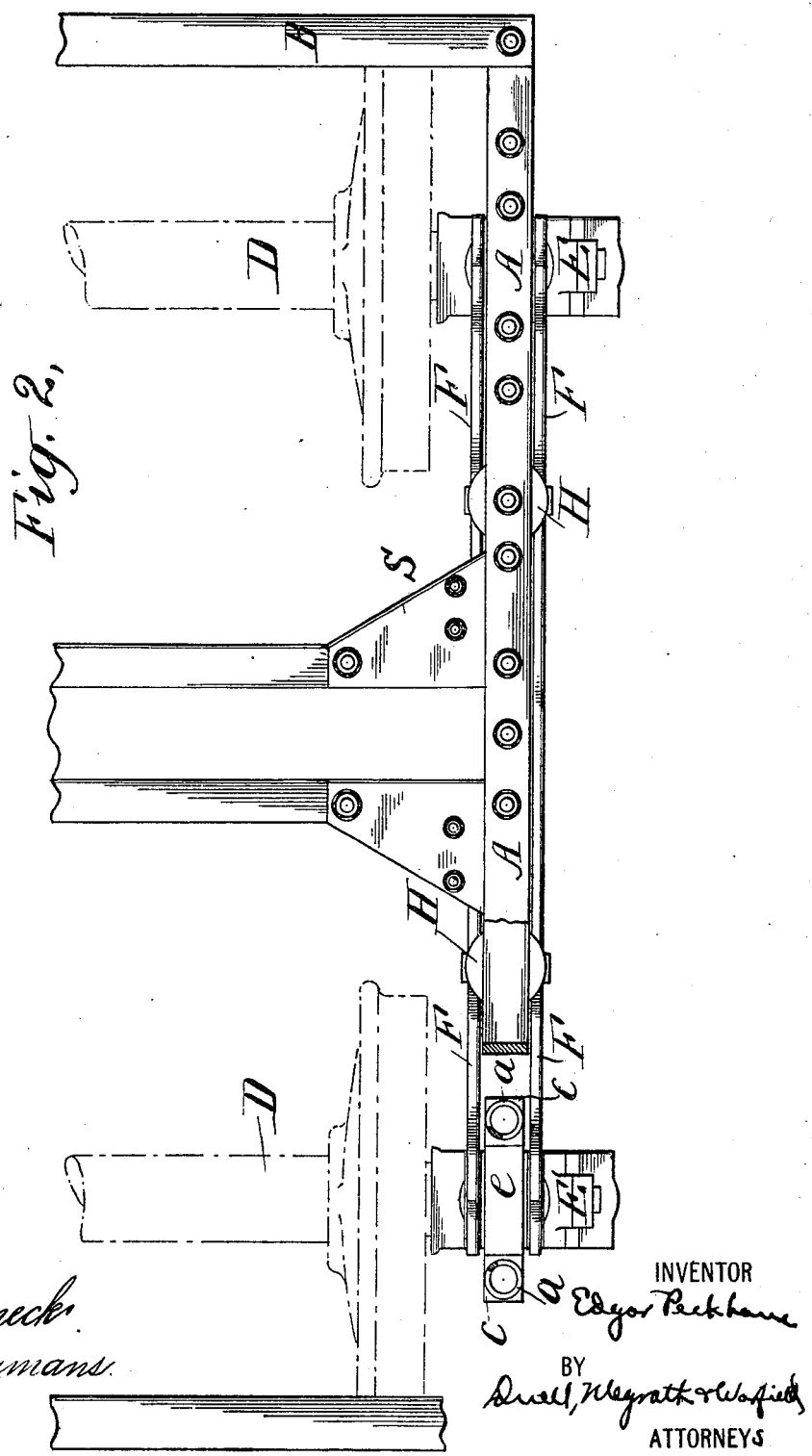

UNITED STATES PATENT OFFICE.

EDGAR PECKHAM, OF KINGSTON, NEW YORK.

CAR-TRUCK.

SPECIFICATION forming part of Letters Patent No. 681,342, dated August 27, 1901.

Application filed June 6, 1901. Serial No. 63,352. (No model.)

*To all whom it may concern:*

Be it known that I, EDGAR PECKHAM, residing at Kingston, in the county of Ulster and State of New York, have invented certain new and useful Improvements in Car-Trucks, of which the following is a full, clear, and exact description, such as will enable others skilled in the art to which it appertains to make and use the same.

This invention relates to the construction of a car-truck designed specially for heavy work and for use as a motor-truck, although it may advantageously be used in connection with trail-trucks and in other relations.

An object of my invention is to provide a truck of a general type similar to that known as the standard "Master Car-Builders'" truck, which will not allow the truck-frame to tilt or pitch forward when the brake is applied to the wheels, thereby obviating one of the disadvantages of the said "Master Car-Builders'" truck.

A second object is to provide in connection with the equalizer-bar and truck-frame of the "Master Car-Builders'" truck special strengthening devices, whereby this truck may be adapted for special uses.

My invention further consists in certain features of construction and combinations of elements whereby an easy-riding, strong, and durable truck will be secured, as will be hereinafter fully described, and the novel features pointed out in the claims at the end of the specification.

In the accompanying drawings, Figure 1 is a side elevation of a truck embodying my improvements. Fig. 2 is a plan view of a portion of the truck-frame with an end of one of the side bars broken away to show the construction of the parts beneath. Fig. 3 is a detail elevation of a modification in which a set of auxiliary springs used in connection with my invention is placed directly between the journal-boxes and the truck-frame. Fig. 4 is a detail elevation showing another position of the auxiliary spring.

Similar reference characters refer to similar parts throughout the several views.

A represents one of the side bars of the truck-frame proper, of which portions of the end bars are shown at B B. This top frame is preferably one solid piece of forging, although it may be made in sections, if desired. Axles D D, wheels C C, and journal-boxes E E are of the usual construction.

Instead of the solid equalizing-bar commonly used on "Master Car-Builders'" trucks, I use two bars F F on each side of the truck and space them sufficiently far apart so that the pedestals G G may be located between them. The journal-box is made sufficiently long to give the proper support for the ends of the equalizing-bars outside of the pedestals. Equalizer-springs H H, of the usual construction, as shown, sustain the weight of the truck-frame and car-body upon the equalizer-bars in a well-known manner. These car-supporting springs are necessarily confined in a space which is limited by the wheel-base of the truck and present in the usual construction a spring base or distance from center to center of these supporting-springs which is limited in length, while the truck-frame must be extended beyond the pedestals and wheels for a distance sufficient to carry the brake-shoes. Accordingly the leverage is such that when the brake is applied to the wheels to stop the car, especially when the brake-shoes are on the outside of the wheels, the truck-frame tilts up or kicks forward, rocking about the points of support furnished by the equalizer-springs. The motion caused thereby is both disagreeable to the passengers in the car and results in great strain and consequent injury to the parts of the truck. To obviate these difficulties, I place within the pedestals G spiral springs $a$ $a$, preferably two for each pedestal, and which are located in the preferable form of construction shown in Fig. 1 between the tops $b$ of the pedestals, which are attached by bolts, as here shown, to the bars A and lugs $c$, which may be projections from saddles $e$, resting upon the journal-boxes within the pedestals, as here shown, or which lugs may be cast directly upon the journal-boxes. These springs carry a portion of the weight of the truck-frame, and the result is that the spring-base of the truck is extended to a length equal to the distance between the outermost springs upon the saddles. The extension of this spring-base in and of itself lessens the tendency to tilt and kick-up of the truck-frame, inasmuch as the outermost points of support are in my construction practically commensurate with the length of the frame, and, furthermore, the strength of the springs $a$ may be so proportioned relatively to springs H that when the inertia of the wheels is suddenly checked upon the application of the brakes these springs $a$ will act in conjunction with and as auxiliaries to springs H to cushion the frame and will practically prevent any longitudinal oscillation. Any tendency which might still remain in the truck-frame to rock upon the main equalizing-springs as fulcrums will be resisted by the full power of the springs $a$, and no rocking or tilting can be possible until such springs are fully compressed, which would be the case, if at all, only under very abnormal conditions.

It is only essential that these auxiliary springs be placed between the extended ends of the truck-frame and a point or points of support in connection with the journal-boxes. Accordingly I show in Fig. 3 a modification wherein the springs $a$ are placed directly between the top of the journal-box and the under side of the upper plate of the pedestal which is bolted to the truck-frame. Obviously this structure can be only advantageously used when the space between such journal-box and truck-frame is sufficient to allow springs of proper size and length therein.

In Fig. 4 a second modification shows the springs $a$ confined between caps $f f$ on the ends of the legs $g g$ of an inverted-U-shaped saddle resting over the journal-box and a connecting-piece $h$ extending across the bottoms of the pedestal-legs below the journal-box. This construction can only be used when the diameter of the wheel is great enough to give space below the pedestals for such springs.

Referring again to Fig. 1, $k k$ are pedestal braces or stays extending from the corners of the truck-frame to the lower ends of the outside pedestal-legs. The ends of the frame are strengthened by angle-pieces $k' k'$, which are secured to the top frame and to the pedestal-braces. A diagonal brace $m$ has its ends secured between the pedestals and the side bars A of the top frame at each end of the truck and is bent downwardly in the middle to pass beneath the transoms $o o$ and connecting-irons $p p$, to the lower one of which it is secured by bolts $q q$, which also pass through and secure thereto the middle portion of brace $r$, which is bent downward on each side of the transoms and is connected at each end to the lower ends of the inside pedestal-legs, between such pedestals and the connecting-pieces $h$. In the construction shown a single bolt or series of bolts pass through the top frame, brace $m$, and top plates of the pedestals, securing these three parts together. In like manner the lower ends of the inside pedestal-legs, brace $r$, and connecting-piece $h$ are bolted together at one end, and the lower ends of the outside pedestal-legs, brace $k$, and connecting-piece $h$. These diagonal braces $m r$ pass between the two parts $f f$ of the equalizing-bars and act with such equalizing-bars to support the weight of the car-body, which is carried upon a bolster situated between the transoms. Any desired form of bolster may be used. I thus provide a construction by which additional strength is given to the truck-frame which carries the weight of the car and also provide a construction wherein in order to release the journal-boxes from the pedestals it is only necessary to remove the connecting-pieces $h$, whereby without any dismantling of other parts the pedestals may be freed from the journal-boxes.

The transom-bars $o o$, which guide the bolsters, are connected at top and bottom by channel-irons $p p$, bolted thereto, and these transom-bars are made of what is known as "bulb angle-iron," thereby insuring great rigidity and supplying strength to the transom-bars at the point where it is most needed—namely, to prevent longitudinal buckling thereof—an accident which often occurs with the flat transom-bars commonly used in trucks of this class. The truck-frame is further strengthened by gussets $s s$, placed between the upper sides of the transom-bars $o$ and the bars A, all these parts being bolted rigidly together, so as to hold the truck square at the transoms.

I illustrate and describe but one side of the truck-frame; but it is obvious that the other parts are duplicates of those shown.

What I claim as new, and desire to secure by Letters Patent, is—

1. In a car-truck, in combination with the usual wheels, journal-boxes, top frame of the truck, and equalizer-bars carrying equalizer-springs which support the truck-frame upon such equalizer-bars, a set or sets of auxiliary springs supporting the ends of the truck-frame upon the journal-boxes.

2. In a car-truck, in combination, with the usual wheels, journal-boxes and top frame, and equalizer-bars carrying equalizer-springs which support the truck-frame upon such equalizer-bars, a set or sets of auxiliary springs between the ends of the truck-frame and points of support connected with the journal-boxes.

3. In a car-truck, in combination, with the usual wheels, journal-boxes, top frame, and equalizer-bars carrying equalizer-springs which support the truck-frame upon such equalizer-bars, a set or sets of auxiliary springs located between the ends of the truck-frame, and lugs projecting from saddles resting on the journal-boxes.

4. In combination, in a car-truck, the journal-boxes E E, top bar A, equalizer-bars F F, equalizer-springs H H between said bar A and said equalizer-bars, pedestals G G, saddles $e e$, lugs $c c$ projecting from said saddles, and supporting-springs for the truck-frame located upon said lugs.

5. In combination, with the usual truck-frame, journal-boxes, equalizer-bars and equalizer-springs, of the "Master Car-Builders'" truck, a set or sets of auxiliary springs located between the ends of the truck-frame and points of support in connection with the journal-boxes, whereby end oscillation or tilting of the truck-frame relatively to the journal-boxes is prevented.

6. In combination, in a truck with the usual top frame, wheels, axles, pedestals and journal-boxes, an equalizer-bar made up of two spaced members F F, and braces $m$, $r$ located between the members of the equalizer-bar, substantially as described.

7. In combination, in a truck with the usual top frame, wheels, axles, pedestals and journal-boxes, an equalizer-bar made up of two spaced members F F, braces $m$, $r$ located between the members of the equalizer-bar, and the connecting-pieces $h$ extending across the bottoms of the pedestals, substantially as described.

8. In combination, in a truck, with a top frame, wheels, axles, pedestals and journal-boxes, an equalizer-bar made up of two spaced members F F, braces $m$, $r$ located between the members of the equalizer-bar, angle-iron transoms $o\ o$, and connecting-pieces $p\ p$ therefor, of which the upper one is connected to the truck-frame and the lower one to said braces, substantially as described.

9. A truck comprising a top frame, angle-iron transoms $o\ o$, gussets $s\ s$, and diagonal braces $m$, $r$, substantially as described.

In testimony whereof I affix my signature in the presence of two witnesses.

EDGAR PECKHAM.

Witnesses:
G. H. BOWERS,
FRANK R. WHITMAN.